United States Patent
Yang et al.

(10) Patent No.: US 12,544,810 B2
(45) Date of Patent: Feb. 10, 2026

(54) TELESCOPIC ADAPTER DEVICE FOR DREDGING MACHINE

(71) Applicant: Zhejiang Jiahong Tools Manufacture Co., Ltd., Lishui (CN)

(72) Inventors: Jianxin Yang, Lishui (CN); Lei Zhang, Lishui (CN)

(73) Assignee: Zhejiang Jiahong Tools Manufacture Co., Ltd., Lishui (CN)

( * ) Notice: Subject to any disclaimer, the term of this patent is extended or adjusted under 35 U.S.C. 154(b) by 466 days.

(21) Appl. No.: 18/198,914

(22) Filed: May 18, 2023

(65) Prior Publication Data

US 2024/0131564 A1 Apr. 25, 2024
US 2024/0226971 A9 Jul. 11, 2024

(30) Foreign Application Priority Data

Oct. 25, 2022 (CN) .......................... 202211307114.1

(51) Int. Cl.
  *B08B 9/045* (2006.01)
  *E03C 1/302* (2006.01)
  *F16C 1/26* (2006.01)

(52) U.S. Cl.
  CPC .............. *B08B 9/045* (2013.01); *E03C 1/302* (2013.01); *F16C 1/262* (2013.01); *B08B 2209/04* (2013.01)

(58) Field of Classification Search
  CPC .......... B08B 9/045; E03C 1/302; F16C 1/262; E03F 9/005
  See application file for complete search history.

(56) References Cited

U.S. PATENT DOCUMENTS

| 4,837,887 A | * | 6/1989 | McLaughlin ........... E03F 9/005 |
| | | | 15/104.33 |
| 10,486,207 B2 | * | 11/2019 | Kehoe ................... B65H 75/364 |
| 2021/0222412 A1 | * | 7/2021 | Emslie .................... B08B 9/045 |
| 2021/0277647 A1 | * | 9/2021 | Reed ....................... E03F 9/005 |

FOREIGN PATENT DOCUMENTS

| CN | 201561008 U | 8/2010 |
| CN | 204690872 U | 10/2015 |
| CN | 106854890 A | 6/2017 |

* cited by examiner

*Primary Examiner* — Laura C Guidotti
(74) *Attorney, Agent, or Firm* — Bayramoglu Law Offices LLC

(57) ABSTRACT

A telescopic adapter device for a dredging machine includes a protective cover at an exit of a flexible shaft of a dredging machine, a connector detachably connected to the protective cover, a flexible shaft conduit with an inner end fixed in an inner hole of the connector, and a sliding conduit sleeved on an outer wall of the flexible shaft conduit, where the sliding conduit includes an inner end provided with a clamping joint for clamping the flexible shaft conduit, and an outer end provided with a bending portion; and a rubber jacket is sleeved on an outer wall of the bending portion. The telescopic adapter device for a dredging machine not only can prevent damage to a glazed surface at a corner of a toilet, but also improves a turning capacity of the flexible shaft.

12 Claims, 2 Drawing Sheets

TELESCOPIC ADAPTER DEVICE FOR DREDGING MACHINE

CROSS REFERENCE TO THE RELATED APPLICATIONS

This application is based upon and claims priority to Chinese Patent Application No. 202211307114.1, filed on Oct. 25, 2022, the entire contents of which are incorporated herein by reference.

TECHNICAL FIELD

The present disclosure relates to pipe dredging machines, and in particular to a telescopic adapter device for a dredging machine.

BACKGROUND

At present, a dredging machine mainly includes a flexible shaft driven by a power mechanism. When the dredging machine is used, the power mechanism causes rotation, extension, and retraction of the flexible shaft, such that the flexible shaft goes deep into a to-be-dredged pipe for blockage removal. This is exemplified by the Extension and Retraction Control Mechanism for Flexible Shaft of Dredging Machine with the application No. 201720178385.X, the Dredging Machine with the application No. 202023301499.X, and the Drum Driving Structure for Dredging Machine and the Dredging Machine with the application No. 201720177673.3. For decades since the emergence of the dredging machine, directly inserting the flexible shaft of the dredging machine into the to-be-dredged pipe has become a common practice in the industry.

However, when the conventional dredging machine is used to dredge a pipe, the rotating and extending flexible shaft is knotted easily and thus cannot go deep into the pipe. When the machine is used to dredge a toilet, the rotating, extending, and retracting flexible shaft comes in direct contact with the toilet to damage a glazed surface of the toilet.

SUMMARY

An objective of the present disclosure is to provide a telescopic adapter device for a dredging machine. The telescopic adapter device not only can prevent damage to a glazed surface at a corner of the toilet, but also improves a turning capacity of the flexible shaft, and effectively prevents the flexible shaft of the dredging machine from twining and knotting at an entrance to the corner of the toilet. Particularly, the telescopic adapter device can be optimally adjusted in length and angle for users with different heights and operation habits, improves a pipe dredging efficiency and makes the operators more comfortable. The telescopic adapter device is installed and detached conveniently. When not used, the telescopic adapter device can be detached to greatly shorten the overall length for the convenience of storage.

To achieve the above objective, the present disclosure adopts the following technical solutions:

A telescopic adapter device for a dredging machine includes a protective cover at an exit of a flexible shaft of a dredging machine, a connector detachably connected to the protective cover, a flexible shaft conduit with an inner end fixed in an inner hole of the connector, and a sliding conduit sleeved on an outer wall of the flexible shaft conduit, where the sliding conduit includes an inner end provided with a clamping joint for clamping the flexible shaft conduit, and an outer end provided with a bending portion; and a rubber jacket is sleeved on an outer wall of the bending portion.

A protective cover through hole for allowing the flexible shaft to pass through is formed in a middle of the protective cover; an outer end of the protective cover is provided with a turnbuckle B clamped with a turnbuckle A of the connector; and the protective cover and the exit of the flexible shaft are connected through a bolt, or connected through a corresponding turnbuckle, or connected by bonding, or connected by welding.

The clamping joint includes a clamping jacket, a triggering buckle, a pin, and an elastic locking member, where the inner end of the sliding conduit is fixed in an inner hole of the clamping jacket; the pin is provided on support lugs at two ends of the clamping jacket; a cam at one end of a triggering handle of the triggering buckle is hinged to the pin; and when the triggering handle is pressed toward the clamping jacket, the triggering handle drives the cam to rotate around the pin, the cam squeezes the elastic locking member, and the elastic locking member radially abuts against the outer wall of the flexible shaft conduit from the clamping jacket and a through hole of the sliding conduit, thereby clamping the flexible shaft conduit.

The connector includes an inner barrel, and an outer ring provided at a periphery of an inner end of the inner barrel; the turnbuckle A is positioned at an inner end of the outer ring; the inner barrel includes the inner end provided with a connector positioning bump matched with a flexible shaft conduit positioning groove, and an outer end provided with a threaded hole corresponding to a flexible shaft conduit fixing hole; and a front end of a bolt extends to the flexible shaft conduit fixing hole through the threaded hole.

The protective cover is connected to the exit of the flexible shaft of the dredging machine through a turnbuckle at an inner end of the protective cover.

The elastic locking member is a rubber pad with an arc surface at an inner end.

Both the sliding conduit and the flexible shaft conduit are made of a stainless steel material.

The present disclosure has the following beneficial effects over the prior art: According to the above technical solutions, a protective cover is provided at an exit of a flexible shaft of a dredging machine. A connector is detachably connected to the protective cover. An inner end of a flexible shaft conduit is fixed in an inner hole of the connector. A sliding conduit is sleeved on an outer wall of the flexible shaft conduit. The sliding conduit includes an inner end provided with a clamping joint for clamping the flexible shaft conduit, and an outer end provided with a bending portion. A rubber jacket is sleeved on an outer wall of the bending portion. When dredging a toilet, the telescopic adapter device with such a structure can be quickly installed on the dredging machine. The front rubber jacket prevents damage of the flexible shaft to a glazed surface of the toilet. The bending portion on the sliding conduit plays a guiding role for the flexible shaft, improves a turning capacity of the flexible shaft, and can effectively prevent the flexible shaft of the dredging machine from twining and knotting at an entrance to a corner. The sliding conduit and the clamping joint can extend and retract along the flexible shaft conduit, while rotating around the flexible shaft conduit. Therefore, the telescopic adapter device can be optimally adjusted in length and angle for users with different heights and operation habits, improves a pipe dredging efficiency and makes the operators more comfortable. When the telescopic adapter device is not used, the sliding conduit and the flexible shaft conduit can be detached conveniently to greatly shorten an overall length for convenience of storage.

The telescopic adapter device further has the following beneficial effects: The clamping joint includes a clamping jacket, a triggering buckle, a pin, and an elastic locking member. The inner end of the sliding conduit is fixed in an inner hole of the clamping jacket. The pin is provided on support lugs at two ends of the clamping jacket. A cam at one end of a triggering handle of the triggering buckle is hinged to the pin. In such a structure, the clamping joint can slide along the flexible shaft conduit. When the triggering handle is pressed toward the clamping jacket, the triggering handle drives the cam to rotate around the pin, the cam squeezes the elastic locking member, and the elastic locking member radially abuts against the outer wall of the flexible shaft conduit from the clamping jacket and a through hole of the sliding conduit, thereby clamping the flexible shaft conduit. Therefore, the telescopic adapter device can be optimally adjusted in length and angle for users with different heights and operation habits, improves a pipe dredging efficiency and makes the operators more comfortable.

The telescopic adapter device further has the following beneficial effects: An outer end of the protective cover is provided with a turnbuckle B clamped with a turnbuckle A of the connector. The protective cover and the exit of the flexible shaft are connected through a bolt, or connected through a corresponding turnbuckle, or connected by bonding, or connected by welding. The protective cover with such a structure is beneficial for modification. Specifically, by providing the protective cover at the exit of the flexible shaft, the ordinary dredging machine can be modified as the dredging machine using the telescopic adapter device of the present disclosure. Furthermore, the protective cover can increase an overlapping length with the buckle of the connector to achieve more stable connection.

The telescopic adapter device further has the following beneficial effects: The connector includes an inner barrel, and an outer ring provided at a periphery of an inner end of the inner barrel. The turnbuckle A is positioned at an inner end of the outer ring. The inner barrel includes the inner end provided with a connector positioning bump matched with a flexible shaft conduit positioning groove, and an outer end provided with a threaded hole corresponding to a flexible shaft conduit fixing hole. A front end of a bolt extends to the flexible shaft conduit fixing hole through the threaded hole. In such a structure, not only can the flexible shaft conduit be connected quickly and stably, but also the overlapping length with the buckle of the protective cover can be increased. Meanwhile, with the turnbuckle A at the end of the outer ring, the distance from the turnbuckle to an axle center is increased, the turnbuckle is clamped more firmly, and the buckle is docked more easily.

In the figures:
1: rubber jacket, 2: sliding conduit, 2-1: clamping joint, 2-1-3: clamping jacket, 2-1-4: triggering buckle, 2-1-4-1: cam, 2-1-5: pin, 2-1-6: elastic locking member, 2-2: bending portion, 7: flexible shaft conduit, 7-1: flexible shaft conduit fixing hole, 7-2: flexible shaft conduit positioning groove, 8: connector, 8-0: inner barrel, 8-1: connector positioning bump, A8-2: turnbuckle, 8-3: outer ring, 8-4: threaded hole, 9: bolt, 10: protective cover, B10-1: turnbuckle, 10-2: turnbuckle at the inner end of the protective cover, 10-3: protective cover through hole, 11: dredging machine, and 12: flexible shaft.

DETAILED DESCRIPTION OF THE EMBODIMENTS

Figure 1:
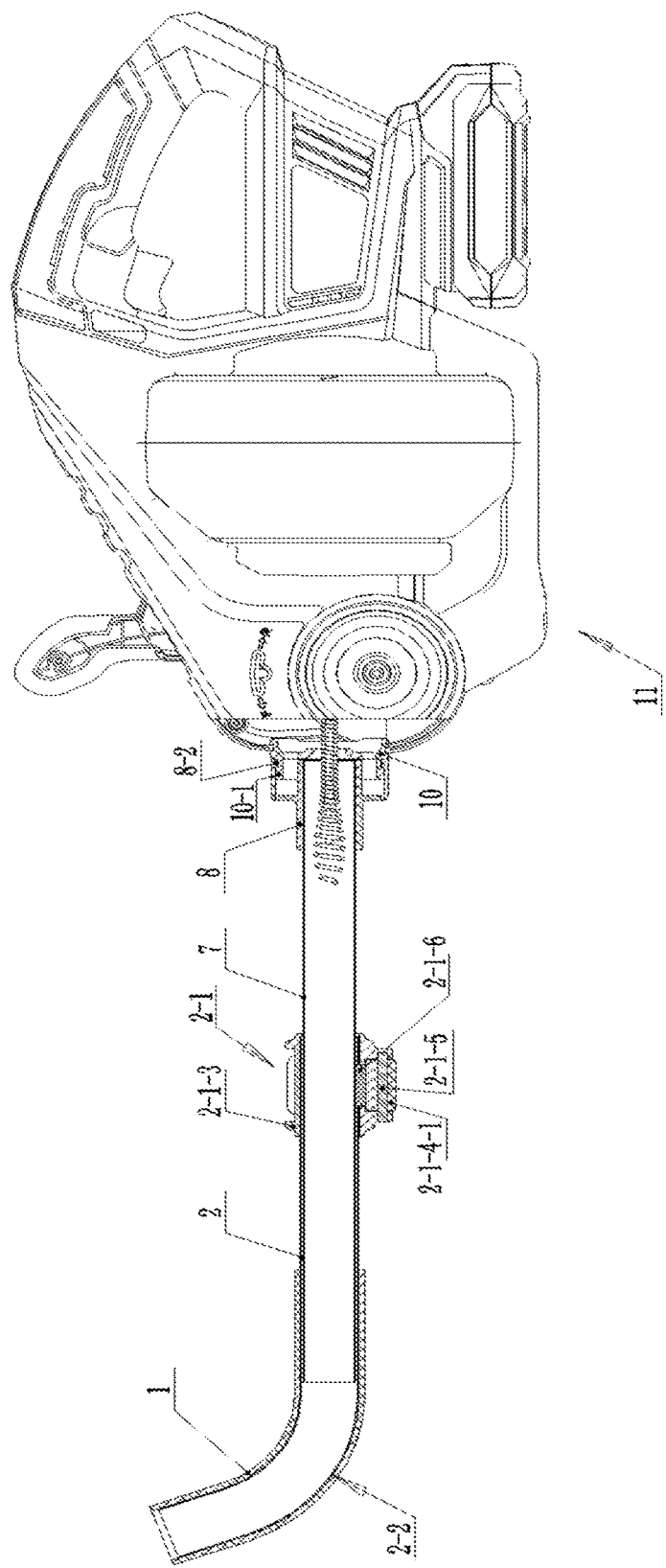
FIG. 1 is a structural schematic view according to the present disclosure.
Figure 2:
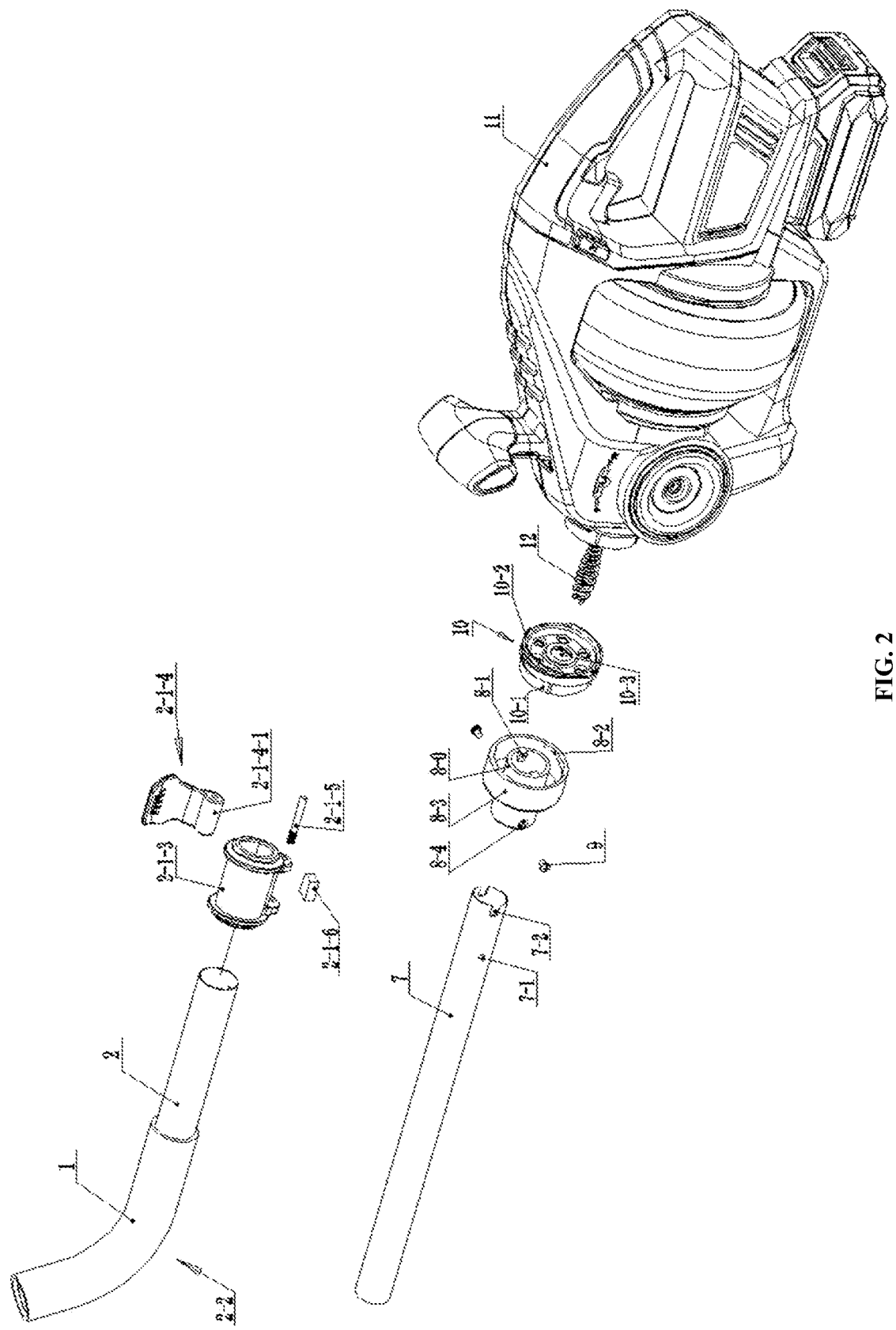
FIG. 2 is an exploded schematic view in FIG. 1.

To make the technical solutions of the present disclosure clearer, the present disclosure is described in detail below with reference to FIG. 1 and FIG. 2. It should be understood that the specific implementations described herein are merely intended to explain the present disclosure, rather than to limit the protection scope of the present disclosure.

The present disclosure provides a telescopic adapter device for a dredging machine, including protective cover 10 at an exit of flexible shaft 12 of dredging machine 11, connector 8 detachably connected to the protective cover 10, flexible shaft conduit 7 with an inner end fixed in an inner hole of the connector 8, and sliding conduit 2 sleeved on an outer wall of the flexible shaft conduit 7. The sliding conduit 2 includes an inner end provided with clamping joint 2-1 for clamping the flexible shaft conduit 7, and an outer end provided with bending portion 2-2. Rubber jacket 1 is sleeved on an outer wall of the bending portion 2-2.

Preferably, protective cover through hole 10-3 for allowing the flexible shaft 12 to pass through is formed in a middle of the protective cover 10. Outer end of the protective cover 10 is provided with turnbuckle B10-1 clamped with turnbuckle A8-2 of the connector 8. The protective cover 10 and the exit of the flexible shaft 12 are connected through a bolt, or connected through a corresponding turnbuckle, or connected by bonding, or connected by welding. The clamping joint 2-1 includes clamping jacket 2-1-3, triggering buckle 2-1-4, pin 2-1-5, and an elastic locking member that is preferably rubber pad 2-1-6 with an arc at an inner end. The inner end of the sliding conduit 2 is fixed in an inner hole of the clamping jacket 2-1-3. The pin 2-1-5 is provided on support lugs at two ends of the clamping jacket 2-1-3. Cam 2-1-4-1 at one end of a triggering handle of the triggering buckle 2-1-4 is hinged to the pin 2-1-5. When the triggering handle is pressed toward the clamping jacket 2-1-3, the triggering handle drives the cam 2-1-4-1 to rotate around the pin 2-1-5, the cam 2-1-4-1 squeezes the elastic locking member 2-1-6, and the elastic locking member 2-1-6 radially abuts against the outer wall of the flexible shaft conduit 7 from the clamping jacket 2-1-3 and a through hole of the sliding conduit 2, thereby clamping the flexible shaft conduit 7. The connector 8 includes inner barrel 8-0, and outer ring 8-3 provided at a periphery of an inner end of the inner barrel 8-0. The turnbuckle A8-2 is positioned at an inner end of the outer ring 8-3. The inner barrel 8-0 includes the inner end provided with connector positioning bump 8-1 matched with flexible shaft conduit positioning groove 7-2, and an outer end provided with threaded hole 8-4 corresponding to flexible shaft conduit fixing hole 7-1. A front end of bolt 9 extends to the flexible shaft conduit fixing hole 7-1 through the threaded hole 8-4. The protective cover 10 is clamped with a corresponding turnbuckle at the exit of the flexible shaft 12 of the dredging machine 11 through turnbuckle 10-2 at an inner end of the protective cover. The elastic locking member 2-1-6 is a rubber pad with an arc surface at an inner end. Both the sliding conduit 2 and the flexible shaft conduit 7 are made of a stainless steel material.

By providing the telescopic adapter device on the dredging machine, the front rubber jacket 1 can protect a glazed surface of a toilet well. With the bending portion 2-2 of the sliding conduit 2, the flexible shaft has a better turning capacity and is not knotted. With the telescopic function, the telescopic adapter device can be optimally adjusted in length and angle for users with different heights and operation habits, improves a pipe dredging efficiency and makes the operators more comfortable. When the telescopic adapter device is not used, the sliding conduit 2 and the flexible shaft conduit 7 are detached conveniently to greatly shorten the overall length for the convenience of storage.

What is claimed is:

1. A telescopic adapter device for a dredging machine, comprising
   a protective cover at an exit of a flexible shaft of the dredging machine,
   a connector detachably connected to the protective cover,
   a flexible shaft conduit with an inner end, wherein the inner end is fixed in an inner hole of the connector, and
   a sliding conduit sleeved on an outer wall of the flexible shaft conduit,
   wherein the sliding conduit comprises an inner end and an outer end, wherein the inner end is provided with a clamping joint for clamping the flexible shaft conduit, and the outer end is provided with a bending portion; and a rubber jacket is sleeved on an outer wall of the bending portion,
   wherein a protective cover through hole for allowing the flexible shaft to pass through is formed in a middle of the protective cover,
   an outer end of the protective cover is provided with a turnbuckle B clamped with a turnbuckle A of the connector, and
   the protective cover and the exit of the flexible shaft are connected through a bolt, or connected through a corresponding turnbuckle, or connected by bonding, or connected by welding.

2. The telescopic adapter device according to claim 1, wherein the clamping joint comprises a clamping jacket, a triggering buckle, a pin, and an elastic locking member;
   the inner end of the sliding conduit is fixed in an inner hole of the clamping jacket;
   the pin is provided on support lugs at two ends of the clamping jacket;
   a cam is hinged to the pin, wherein the cam is at one end of a triggering handle of the triggering buckle; and
   when the triggering handle is pressed toward the clamping jacket, the triggering handle drives the cam to rotate around the pin, the cam squeezes the elastic locking member, and the elastic locking member radially abuts against the outer wall of the flexible shaft conduit from the clamping jacket and a through hole of the sliding conduit, thereby clamping the flexible shaft conduit.

3. The telescopic adapter device according to claim 2, wherein the connector comprises an inner barrel, and an outer ring provided at a periphery of an inner end of the inner barrel;
   the turnbuckle A is positioned at an inner end of the outer ring;
   the inner barrel comprises the inner end and an outer end, wherein the inner end is provided with a connector positioning bump matched with a flexible shaft conduit positioning groove, and the outer end is provided with a threaded hole corresponding to a flexible shaft conduit fixing hole; and
   a front end of a bolt extends to the flexible shaft conduit fixing hole through the threaded hole.

4. The telescopic adapter device according to claim 2, wherein the protective cover is connected to the exit of the flexible shaft of the dredging machine through a turnbuckle at an inner end of the protective cover.

5. The telescopic adapter device according to claim 2, wherein the elastic locking member is a rubber pad with an arc surface at an inner end.

6. The telescopic adapter device according to claim 2, wherein the sliding conduit and the flexible shaft conduit are made of a stainless steel material.

7. The telescopic adapter device according to claim 1, wherein the connector comprises an inner barrel, and an outer ring provided at a periphery of an inner end of the inner barrel;
   the turnbuckle A is positioned at an inner end of the outer ring;
   the inner barrel comprises the inner end and an outer end, wherein the inner end is provided with a connector positioning bump matched with a flexible shaft conduit positioning groove, and the outer end is provided with a threaded hole corresponding to a flexible shaft conduit fixing hole; and
   a front end of a bolt extends to the flexible shaft conduit fixing hole through the threaded hole.

8. The telescopic adapter device according to claim 1, wherein the clamping joint comprises an elastic locking member is a rubber pad with an arc surface at an inner end.

9. The telescopic adapter device according to claim 1, wherein the sliding conduit and the flexible shaft conduit are made of a stainless steel material.

10. The telescopic adapter device according to claim 1, wherein the connector comprises an inner barrel, and an outer ring provided at a periphery of an inner end of the inner barrel;
    the turnbuckle A is positioned at an inner end of the outer ring;
    the inner barrel comprises the inner end and an outer end, wherein the inner end is provided with a connector positioning bump matched with a flexible shaft conduit positioning groove, and the outer end is provided with a threaded hole corresponding to a flexible shaft conduit fixing hole; and
    a front end of a bolt extends to the flexible shaft conduit fixing hole through the threaded hole.

11. The telescopic adapter device according to claim 1, wherein the protective cover is connected to the exit of the flexible shaft of the dredging machine through a turnbuckle at an inner end of the protective cover.

12. A telescopic adapter device for a dredging machine, comprising
    a protective cover at an exit of a flexible shaft of the dredging machine,
    a connector detachably connected to the protective cover,
    a flexible shaft conduit with an inner end, wherein the inner end is fixed in an inner hole of the connector, and
    a sliding conduit sleeved on an outer wall of the flexible shaft conduit,
    wherein the sliding conduit comprises an inner end and an outer end, wherein the inner end is provided with a clamping joint for clamping the flexible shaft conduit, and the outer end is provided with a bending portion; and a rubber jacket is sleeved on an outer wall of the bending portion, wherein the protective cover is connected to the exit of the flexible shaft of the dredging machine through a turnbuckle at an inner end of the protective cover.

\* \* \* \* \*